Patented Feb. 8, 1949

2,460,980

UNITED STATES PATENT OFFICE 2,460,980

PROCESS FOR THE PREPARATION OF ISO-CYANATE DERIVATIVES OF PROTEINS

Heinz L. Fraenkel-Conrat and Harold S. Olcott, Berkeley, Calif., assignors to the United States of America as represented by the Secretary of Agriculture No Drawing. Application September 27, 1945, Serial No. 619,011

10 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to proteins, particularly to protein derivatives having low-water absorption properties, and has among its objects the provision of such derivatives for use in plastics and related products. Other objects will become apparent from the following description of the invention.

Proteins used in plastics and in similar products are restricted in application because of their excessive absorption of water. The water absorption of protein disks prepared according to a modification of the A. S. T. M. method D–570–42, ought not to exceed about 4 percent and preferably should be less than 1 percent of the original weight of the protein after immersion in water for about 24 hours. It is known, however, that disks pressed from such proteins as wheat gluten, egg albumin, feather and cattle hoof keratin, casein, and zein, will absorb about from 15 to 100 percent of their original weight under the conditions of this method.

The tendency of a protein to absorb water is governed, at least in part, by the polar groups on the side chains. Therefore, in order to reduce the affinity of a protein for water, it is necessary to remove such groups or to replace them with hydrophobic substances.

We have found that aromatic isocyanates and long chain aliphatic isocyanates, in the absence of water, are effective reagents for the production of protein derivatives of low-water absorption. These isocyanates include phenyl isocyanate, the chlorophenyl isocyanates, p-biphenyl isocyanate, o-biphenyl isocyanate, o-bicyclohexyl isocyanate, beta-naphthyl isocyanate, beta-anthryl isocyanate, p-cetyl phenyl isocyanate, the bi-isocyanates prepared from benzidine and p-phenylene diamine, undecyl isocyanate, and heptadecyl isocyanate. For example, when cattle hoof powder is heated with dry phenyl isocyanate, its water absorption is reduced from about 23 percent to about 1 percent, and in addition, the product has improved flow properties.

According to the invention, a dry protein is suspended in an aromatic or a long chain aliphatic isocyanate under anhydrous conditions, and the suspension is heated at elevated temperatures. It is preferable to conduct the reaction at temperatures of about from 70° to 100° C. and to use a catalyst, preferably anhydrous pyridine, to obtain a maximum reaction in as short a time as possible.

It has been found, also, that the method of preparation of a protein and its physical state are significant factors in determining the rate and extent of its reaction with the isocyanates, and that it is therefore necessary to determine for each protein separately the optimum method of preparation prior to its treatment with the isocyanate. For example, it was difficult to obtain a product having a low-water absorption from dried egg white and isocyanate, but the reaction proceeded satisfactorily after removal of the inorganic ions. Also, with wheat gluten, it was found that denatured gluten reacted more satisfactorily than did the native gluten. Furthermore, more water-resistant products were obtained from zein, gluten, and casein when these were first evaporated in the frozen state from an acetic-acid solution or suspension than that obtained when the protein was used without preliminary treatment. It will be understood that products of decreased water absorption could be obtained without pretreatment of the protein but that when proteins were prepared as described above, the products of the reaction with isocyanates possessed even lower water absorptions.

The following example is illustrative of the invention: One part of dry protein is mixed with approximately an equal amount of phenyl isocyanate (1 ml. per gm. protein) and a 2.5-fold amount of dry pyridine. The mixture is allowed to react at about 70° C. for about 24 hours, after which excess reagent and solvent are removed by washing the mixture with dry toluene. The protein is then separated by filtration or centrifugation, washed once with toluene and once with ethanol, and subsequently is extracted for alcohol or ether to remove N, N-diphenyl urea, about one day in a continuous extractor, with which is byproduct of the reaction. The product is finally dried with ether, and then in an oven at about 50° C. The yields vary from about 100 percent to about 140 percent of the weight of the original protein, depending on the amount of interaction and, to a lesser extent, upon the solubility of the original protein in the reagents used.

Variations in technique in the above example may be made, but it is essential that water be excluded from the reaction mixture in order to obtain the highest water resistance in the product, since pyridine catalyzes the reaction of water with phenyl isocyanate. The amount of phenyl isocyanate cannot be decreased to less than half, if maximum reaction is intended, while an increase over the amount suggested is of no advantage. The reaction can be performed at about 100° C. instead of about 70° C., in which case it approaches completion within about 6 or 8 hours.

The removal of excess phenyl isocyanate can be accomplished most conveniently by washing the reaction product with inert solvents, such as toluene or benzene. However, distillation or reaction with water or with ethanol also is effective. The object of the subsequent extraction with ethanol or ether is the removal of the N,N-diphenyl urea which, in small amounts, is a byproduct and which forms in considerable amounts from the excess phenyl isocyanate if water is used in terminating the reaction.

In the following table are shown the water absorption for disks pressed from untreated proteins and from the same proteins after treatment with phenyl isocyanate, undecyl isocyanate, and heptadecyl isocyanate, as described in the above example. The disks were prepared by pressing 2 grams in a die 1 inch in diameter for 5 minutes, at 5 tons per square inch, at a temperature of about 163° C. They were then immersed in water for about 24 hours, the gain in weight being expressed as the percentage of the weight of the original disk weight. Not only was improvement in water resistance obtained, but the phenyl isocyanate derivatives possessed improved flow properties. Thus, in order to obtain uniform disks with some of the untreated proteins, it is necessary to add 10 percent of water as a plasticizer, whereas in contrast to this, the phenyl isocyanate-treated proteins formed homogeneous and generally translucent disks without the addition of water.

*Absorption of water by pressed disks of proteins, with and without treatment with isocyanates*

| Protein | Water absorption after 24 hours' soaking, as percentage of original weight of disk, Treated with— | | | |
|---|---|---|---|---|
| | Untreated | Phenyl Isocyanate | Undecyl Isocyanate | Heptadecyl Isocyanate |
| Cattle hoof powder | 28 | 1.7 | 2.0 | 3.0 |
| Feather powder | 20 | 1.0 | 1.8 | |
| Egg white | 45 | 1.1 | 1.4 | 1.5 |
| Denatured gluten | 77 | 2.6 | | |
| Zein | 17 | 1.0 | | |
| Rennet casein | 67 | 1.2 | | |

The figures shown for egg white, zein, and rennet casein in the "untreated" column in the above table were obtained by using these materials in their unpretreated condition. However, when treated with phenyl isocyanate, as indicated in column 3, they had previously been pretreated.

It has been found that, under the conditions of the invention, as illustrated in the foregoing example, the isocyanates react with most of the basic groups, including the amino, guanidyl, and imidazole groups; the acid groups including carboxyl, thiol, and phenolic groups; and the primary amide groups of the protein side chains. It is thus clear that the hydrophobic benzene ring or long aliphatic chain has been substituted for almost all of the hydrophylic groups of the proteins, and the resulting products possess the desirable property of low water absorption.

It should be noted that, by varying the conditions of treatment, products of all degrees of water resistance intermediate between those of the original protein and those finally produced by the invention can be prepared. In such cases, fewer of the polar groups have reacted.

Having thus described our invention, we claim:

1. A process of preparing a protein derivative comprising reacting a protein with an isocyanate selected from the group consisting of aromatic isocyanates and long chain aliphatic isocyanates under anhydrous conditions, in the presence of pyridine, and at an elevated temperature.

2. A process of preparing a protein derivative comprising reacting a protein with an isocyanate selected from the group consisting of aromatic isocyanates and long chain aliphatic isocyanates under anhydrous conditions, in the presence of pyridine, and at a temperature of about from 70° C. to 100° C.

3. A process of preparing a protein derivative comprising reacting a protein with an approximately equal amount of an isocyanate selected from the group consisting of aromatic isocyanates and long chain aliphatic isocyanates under anhydrous conditions, in the presence of pyridine, and at a temperature of about from 70° C. to 100° C.

4. A process of preparing a protein derivative comprising reacting a protein with an aromatic isocyanate under anhydrous conditions, in the presence of pyridine, and at a temperature of about from 70° C. to 100° C.

5. A process of preparing a protein derivative comprising reacting a protein with an approximately equal amount of an aromatic isocyanate under anhydrous conditions, in the presence of pyridine, and at a temperature of about from 70° C. to 100° C.

6. A process of preparing a protein derivative comprising reacting a protein with phenyl isocyanate under anhydrous conditions, in the presence of pyridine, and at a temperature of about from 70° C. to 100° C.

7. A process of preparing a protein derivative comprising reacting a protein with a long chain aliphatic isocyanate under anhydrous conditions, in the presence of pyridine, and at a temperature of about from 70° C. to 100° C.

8. A process of preparing a protein derivative comprising reacting a protein with an approximately equal amount of a long chain aliphatic isocyanate under anhydrous conditions, in the presence of pyridine, and at a temperature of about from 70° C. to 100° C.

9. A process of preparing a protein derivative comprising reacting a protein with undecyl isocyanate under anhydrous conditions, in the presence of pyridine, and at a temperature of about from 70° C. to 100° C.

10. A process of preparing a protein derivative comprising reacting a protein with heptadecyl isocyanate under anhydrous conditions, in the presence of pyridine, and at a temperature of about from 70° C. to 100° C.

HEINZ L. FRAENKEL-CONRAT.
HAROLD S. OLCOTT.

(References on following page)

REFERENCES CITED

The following references are of record in the file of this patent:

UNITED STATES PATENTS

| Number | Name | Date |
|---|---|---|
| 2,220,441 | Esselman et al. | Nov. 5, 1940 |

FOREIGN PATENTS

| Number | Country | Date |
|---|---|---|
| 505,976 | Great Britain | May 12, 1939 |

OTHER REFERENCES

Fraenkel-Conrat, J. Biol. Chem., vol. 152, February 1944, pp. 385–389. (Copy in Scientific Library.)

Fraenkel-Conrat et al., J. Am. Chem. Soc., vol. 67, pp. 314 to 319 (February 1945). (Copy in Patent Office Scientific Library.)